June 15, 1937.  B. BRONSON  2,084,014
FLEXIBLE COVERING FOR AUTOMOBILE RUNNING BOARDS
Filed July 3, 1933  4 Sheets-Sheet 1
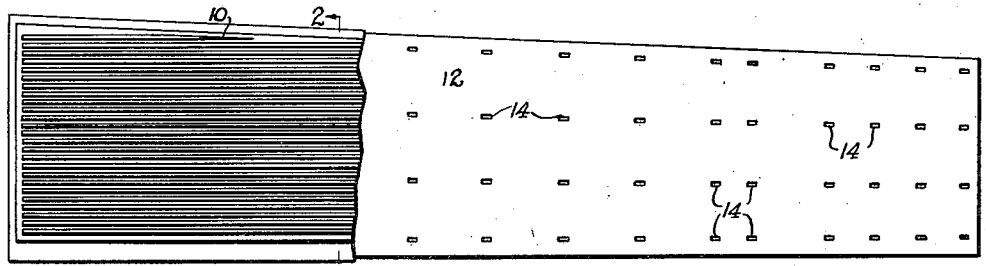
Fig. 1
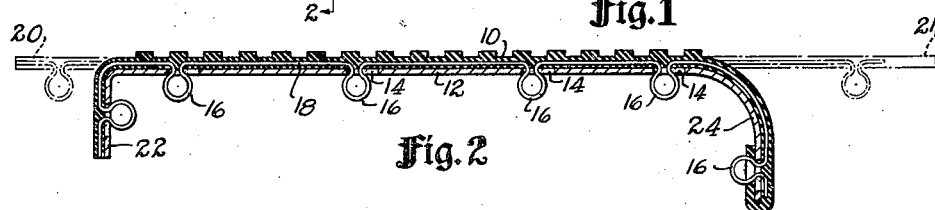
Fig. 2
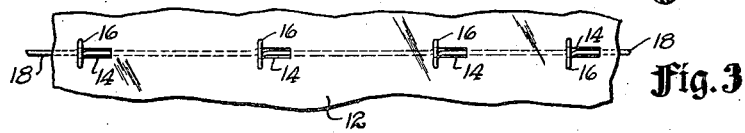
Fig. 3
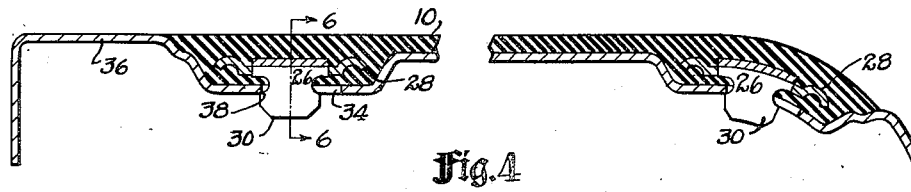
Fig. 4
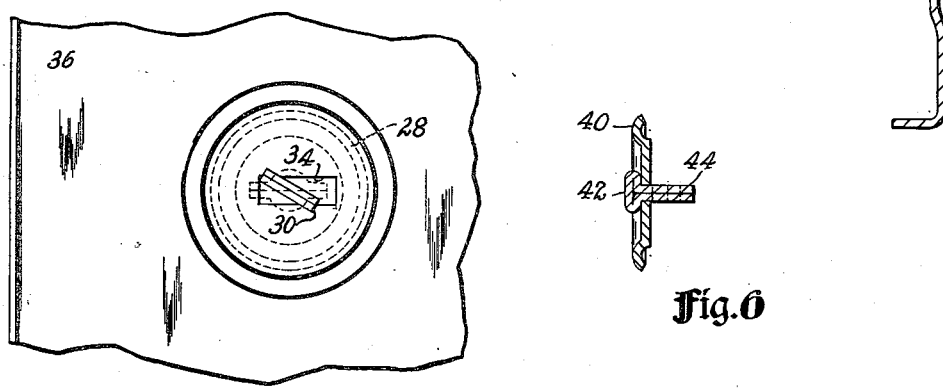
Fig. 5
Fig. 6
INVENTOR
Budel Bronson
BY
Justin W Macklin
ATTORNEY

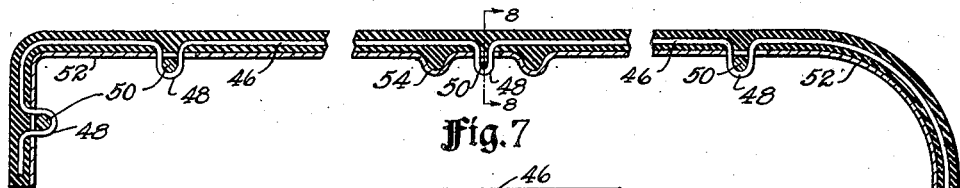
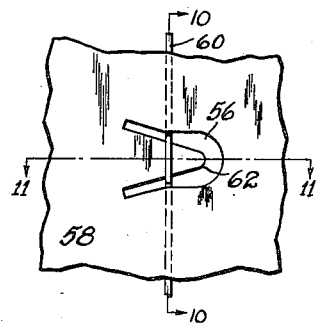
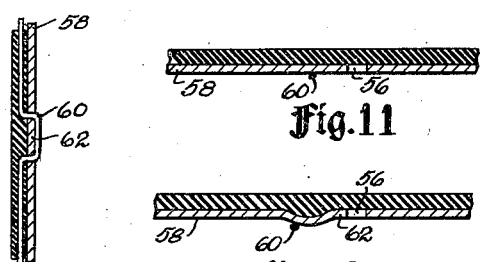
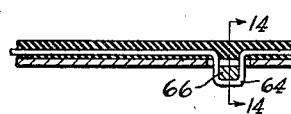
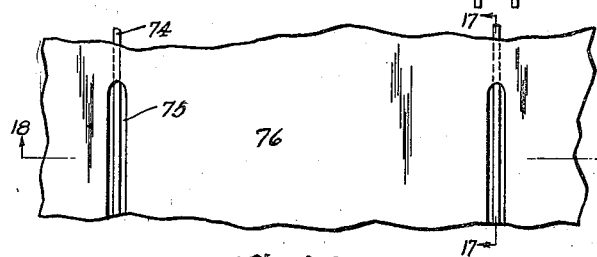
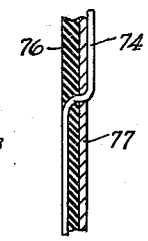
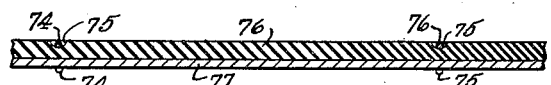

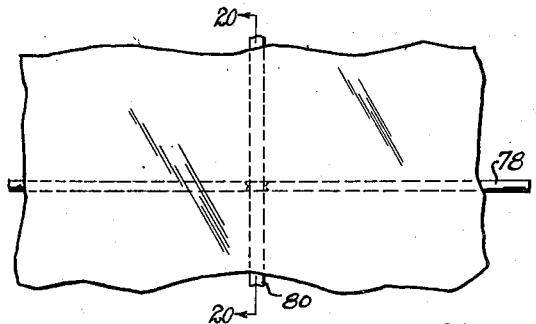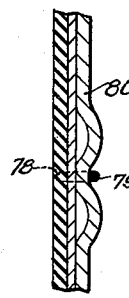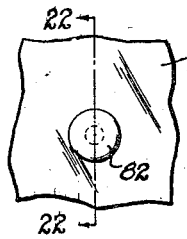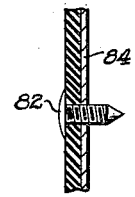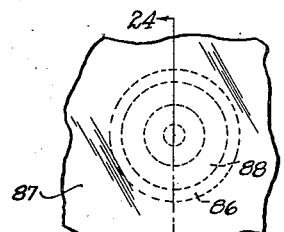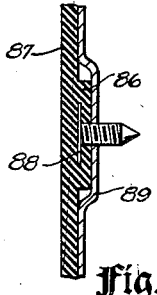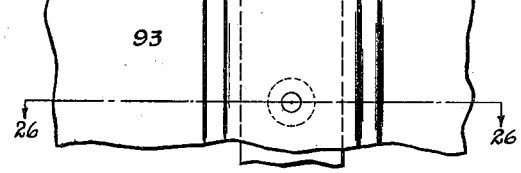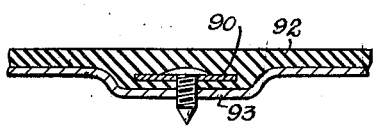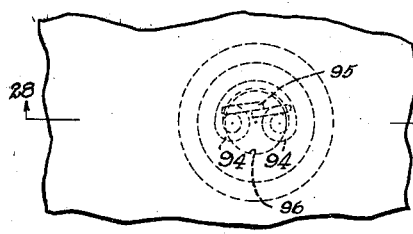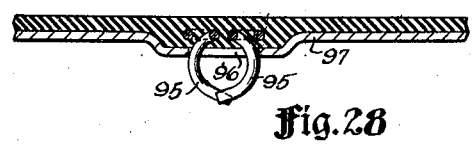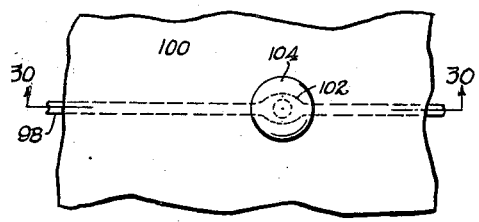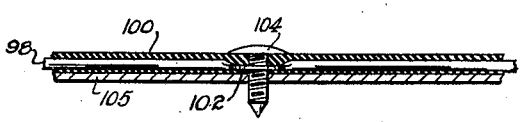

June 15, 1937. B. BRONSON 2,084,014
FLEXIBLE COVERING FOR AUTOMOBILE RUNNING BOARDS
Filed July 3, 1933 4 Sheets-Sheet 4
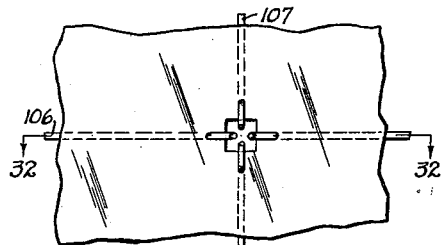
Fig.31
Fig.32
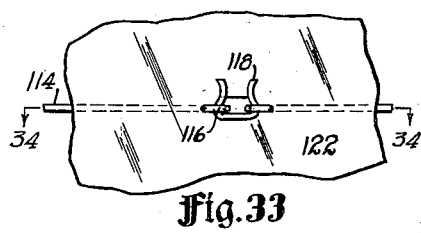
Fig.33
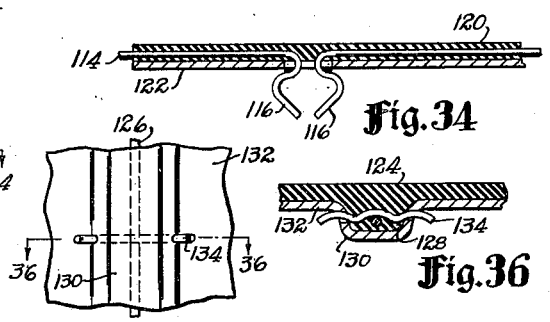
Fig.34
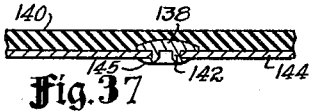
Fig.37
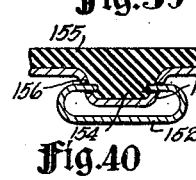
Fig.35
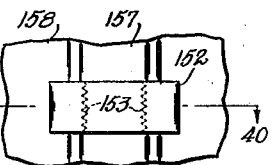
Fig.36
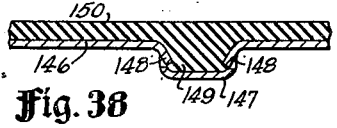
Fig.38
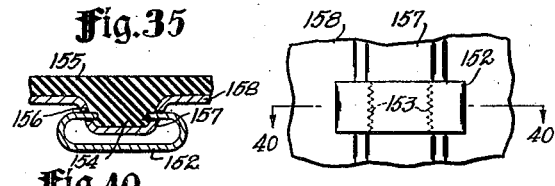
Fig.40
Fig.39
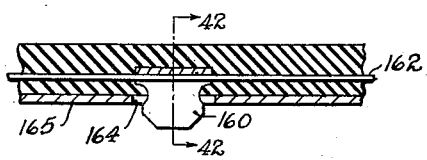
Fig.41
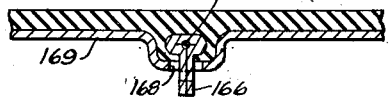
Fig.42
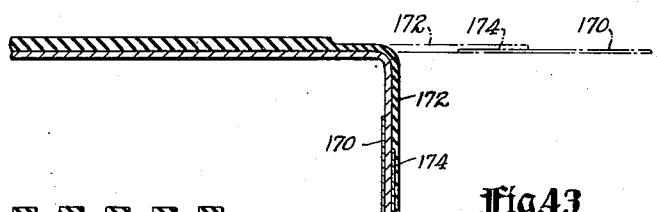
Fig.43
Fig.44
INVENTOR
Budd Bronson
BY
Justin W Macklin
ATTORNEY Patented June 15, 1937

2,084,014

UNITED STATES PATENT OFFICE 2,084,014

FLEXIBLE COVERING FOR AUTOMOBILE RUNNING BOARDS

Budd Bronson, Cleveland, Ohio, assignor to The Ohio Rubber Company, Willoughby, Ohio, a corporation of Ohio Application July 3, 1933, Serial No. 678,855

8 Claims. (Cl. 280—169)

My invention relates to quickly attachable, separately manufactured, covering for automobile running boards, or the like, and which is also readily detachable where replacements are to be made.

The present general method of making running boards and coverings for the same consists in forming the running board in suitable pressing or forming dies in one plant, then shipping or transferring the formed boards to a separate plant where rubber or composition covering is vulcanized or cemented thereon. This entails considerable extra expense in the rehandling and reshipping of the boards. Also, in this vulcanizing or cementing process it is necessary to use practically duplicate sets of dies to those used in the forming process, with the consequent result that the investment for dies, because of this duplication, is extremely high. It is well recognized in the art that rubber articles, such as running board coverings or the like, may be molded separately with molding dies which cost considerably less than the pressing or forming dies necessary for forming the running boards. It is also well known that a greater rate of production can be obtained if the rubber or composition coverings can be made separately from the running boards, and that less space for the manufacture thereof would be required. It is therefore obvious that if the coverings are made separately changes in running board design can be more frequent without large expenditures for manufacturing equipment, and the expense of rehandling and reshipping is minimized. It is therefore an object of my invention to provide a running board covering that may be manufactured separately and apart from the running board with which it is to be assembled.

It is also an object of my invention to provide a running board covering that may be quickly attachable to a running board regardless of shape or contour and which is firmly held in position on either curved surfaces or downwardly turned flanges, or the like, and which eliminates the necessity for edge binding strips. Such a covering is also adapted to be quickly detachable, so that replacements may be made in considerably less time and with considerably less effort than for coverings cemented or vulcanized on a board.

It is a further object to provide a quickly attachable, flexible, reinforced running board covering adapted to be pulled tightly down against a running board and drawn thereacross tightly to provide a snug fit, and which will resist distortional stresses imparted by the feet of persons stepping thereon. It is further important to maintain the downward and transverse tension on the cover member throughout the life of its use.

It is common knowledge that running board coverings cemented or vulcanized on the board itself have a tendency to and will often blister, that is, the rubber or composition covering will loosen from the board itself and rise therefrom, either because of trapped air underneath or because of an expansion of zones in the rubber or composition covering itself. It is an object of my invention to overcome this tendency by providing a covering which precludes the trapping of air underneath and which is suitably reinforced with wire or metal strip reinforcing members so located within and throughout the length and breadth of the running board covering as to minimize or entirely prevent local expansion therein.

It is another object of my invention to make possible the manufacture of coverings for running boards on an increased production basis, and to provide a reinforced covering which may be manufactured at a very low cost.

Other and more specific objects of my invention will be apparent from the following description, in connection with the attached drawings, which illustrate a number of forms that my invention may take. With reference to these illustrations, Fig. 1 is a plan view partly cut away showing the general form of my invention.

Fig. 2 is a sectional view along the line 2—2 of Fig. 1.

Fig. 3 is a fragmentary bottom view of that shown in Fig. 2.

Fig. 4 is a fragmentary enlarged sectional view showing another embodiment of my invention.

Figs. 5 to 42, inclusive, show details of various modified forms that the holding elements embodied in my invention may take.

Figs. 43 and 44 are fragmentary sectional views of forms of attaching the edge of a covering to a running board.

Referring now to Fig. 1, there is shown a running board covering 10 overlying a metal running board 12. The running board 12 has punched, or otherwise formed therein, a plurality of apertures or holes 14, through which eyes or formed heads 16 integral with reinforcing members 18, embedded in the covering 10, may extend, as is more clearly shown in Fig. 2. The running board covering, which may be of rubber, rubber composition or other like material, is preferably molded flat with a number of reinforcing members 18 extending transversely or longitudinally, or both, thereof. The covering is then laid over the running board 12, extending beyond it as indicated by the dotted lines 20 and 21, and thereafter folded down over the running board, so that the eyes or heads 16 pass through the apertures 14. Thereafter the eyes or heads 16 are twisted or rotated through a convenient angle, as for example a 90° angle, as is shown in Fig. 3, thereby tightly and snugly forcing the covering 10 against and drawing it across the adjacent surface of the running board 12 under tension. This tension is, however, not great enough to cause "checking" of the covering material, as the tension is principally in the reinforcing members. The downwardly extending edge 22 of the running board shown is adapted to be secured to and against an apron member extending longitudinally of the automobile. The curved and turned down edge 24 is intended to be the exposed or outmost edge of the running board, whereupon the covering 10 may be folded therearound, as shown at the right of Fig. 2, and the eyes of head members 16 passed therethrough before twisting or rotating.

It may thus be seen that I have provided a reinforced, quickly attachable and detachable covering which may be manufactured apart from the metal running board with which it is to be assembled. The number and direction of the reinforcing members 18 and the number of apertures or slots 14 in the running board may be varied to suit the requirements. For example since the portion of the running board adjacent the front end of the car is used more than the rear end, I may provide a greater number of reinforcing members 18 near the front end, so that torsional stresses introduced in the covering by constant stepping thereon may be arrested due to the increased number of reinforcing members. The formation of the eyes or heads 16 is adapted to pull the covering tightly against the running board and to cause it to be drawn down tightly transversely and lengthwise of the board.

Other forms of attaching means are illustrated in the other figures. In Fig. 4 is shown an element 26 molded in the covering and having flange members 30 and a head portion adapted to be passed through a member 28 embedded in the rubber and through a slot or hole 34 in a running board 36 and thereafter rotated or turned through a suitable angle to cause engagement of the edges 38 with the underside of the running board, as is shown in Fig. 5.

Fig. 6 shows another element that may be molded in a covering, in which a crimped disk member 40 has a cotter pin or like element 42 associated therewith and having legs 44 adapted to be passed through an aperture in a running board, as heretofore described, and then bent upwardly under the board to secure the covering thereto.

Fig. 7 shows another modification in which a reinforcing member 46 is bent downwardly at periodic intervals to form loops 48 through which securing or retaining members 50 may be passed on the underside of a running board 52 to hold the covering thereto, as is more clearly indicated in Fig. 8. Shoulders 54 may be formed in the running board 52, thereby causing the retaining member 50 to draw the cover tightly down against the board.

In Fig. 9 is shown a V-shaped slot or aperture 56 punched in a running board 58, and a reinforcing member 60, molded or embedded in a covering, looped down and under the prong 62, as is indicated in section in Figs. 10 and 11. The prongs 62 may be bumped slightly to more securely hold the downwardly looped portion of the transverse member 60, as is shown in Fig. 12.

In Figs. 13 and 14 a downwardly looped portion 64 of a reinforcing member may have a retaining wedge 66, with a slot 67 therein, forced therethrough until the loop 64 slips into the slot 67.

Fig. 15 shows another modification in which a reinforcing member 68 may be interrupted at predetermined intervals to provide downwardly extending elements 69 adapted to be passed through adjacent apertures 70 and 71 and be twisted as shown at 72 to firmly secure the covering to the running board.

In Figs. 16 and 17 reinforcing members 74 may be passed along slots 75 in the upper surface of a covering 76 and thence downwardly through the covering and beneath the running board 77 for a short interval, thereafter passing upwardly along another slot 75, to securely hold the covering against the running board. Fig. 18 is a sectional view along the line 18—18 of Fig. 16 showing the alternative positions of the transverse reinforcing element 74.

Figs. 19 and 20 show another modification in which the reinforcing member 78 is looped downwardly as at 79 to have passed therethrough a specially formed retaining member 80.

Figs. 21 and 22 show a holding unit in which a headed securing member 82 is adapted to be driven through the covering into a pre-formed aperture in a running board 84. The characteristic of the securing and holding member 82 is that it forms its own threads when driven into a metallic element, such as the running board mentioned. This form of retaining element is commonly known on the market as the Parker-Kalon screw.

Figs. 23 and 24 show an adaptation of this latter type of securing element having a large flat head 88, and being partially embedded in a thickened portion 86 of a covering 87, the screw part being adapted to be driven through a preformed aperture in a running board 89.

Figs. 25 and 26 show still another form of securing means which I may employ and in this form, a strip member 90 is suitably secured to the covering 92, as by being embedded therein. The strip member 90 is provided with spaced apertures which are adapted to be substantially in alignment with apertures in the running board 93 when the covering is placed on the board. Means is also provided to secure the covering to the board, this means consisting of members extending through the apertures in the strip member 90 and the running board 93 and suitably interlocked with the running board to hold the cover securely in place. In the form illustrated in the drawings there are screws which extend through the apertures in the strip member 90, and the running board 93, the threaded portion of the screw engaging the running board 93.

In Figs. 27 and 28 is shown a retaining element bent to form horizontally extending loops 94, embedded within the covering, and downwardly extending arcuate prong members 95 adapted to be bent inwardly when passing through an aperture 96 of a running board 97 and thereafter expanding into binding engagement with the under edges of this aperture to hold the covering to the running board.

Figs. 29 and 30 illustrate another form of my invention in which a reinforcing element 98, molded in a covering 100, has therein periodically flattened portions 102 apertured to pass a headed securing member 104 therethrough into thread-forming engagement with a preformed aperture in a running board 105, similar to that heretofore referred to.

Figs. 31 and 32 illustrate another form in which laterally extending reinforcing members 106 and longitudinally extending reinforcing members 107 are interrupted at intervals and bent to form a cluster of downwardly projecting head forming members 108, adapted to be sprung inwardly while passing through an aperture 110 in a running board 112, and thereafter expanding to pull the covering tightly thereto.

In Figs. 33 and 34 a transverse reinforcing member 114 is interrupted and bent downwardly similar to that shown in Fig. 32 to form a pair of prong-like members 116 adapted to have a clamping element 118 associated therewith to draw a covering 120 down against the running board 122.

Figs. 35 and 36 show a covering 124 having a reinforcing member 126 extending therethrough in a thickened portion 128 adapted to interfit a depressed channel-like portion 130 of a running board 132. A locking and securing member 134 is adapted to be passed through the thickened portion 128 and apertured side walls of the channel 130 above the reinforcing member 126, as shown in Fig. 36.

Fig. 37 shows another holding means having a head portion 138 embedded in a covering 140 and having downwardly extending prong members 142 adapted to extend through an aperture in a running board 144 and be bent upwardly thereunder as at 145.

In Fig. 38 a running board 146 has a depressed channel-like portion 147 with slitted side walls 148 adapted to be pushed inwardly to grip a thickened portion 149 of a covering 150.

Figs. 39 and 40 show another arrangement whereby a clamping element 152 having serrated edges 153 is adapted to be pressed into pinching engagement with a thickened portion 154 of a covering 155 through slots 156 in a channel shaped portion 157 of a running board 158.

Fig. 41 shows a securing element 160 attached to a reinforcing element 162 and adapted to pass through a slot 164 in a running board 165 and be twisted in a manner similar to that indicated and described in connection with Figs. 4 and 5.

Fig. 42 shows a similar modification in which a cotter pin or like element 166 is similarly connected to a reinforcing member 167, the legs of the cotter pin passing down through an aperture 168 of a running board 169, and bent outwardly and upwardly against the under side of the running board to secure a covering thereto.

In Fig. 43 is shown a method of securing the edges of a covering to a running board. As there shown a bendable metallic element 170 is molded into or vulcanized to a covering 172, as at 174, and upon assembly of the covering with a running board is bent around its edges to draw the covering tightly to the board.

Fig. 44 shows another method similar to that in Fig. 43, a similar bendable metallic member 176 being molded into or vulcanized to a covering 178, as at 179, and then bent around the edge of a running board 180 as shown.

In all of the modifications illustrated and described it is to be understood that the covering for the running board may extend laterally and longitudinally over the entire area thereof, as is illustrated in Figs. 1 and 2, or it may extend over only a portion of the area as is indicated in Fig. 4. The covering may be of uniform thickness throughout or varying thicknesses, either as indicated in Fig. 2 or Fig. 4. Similarly, it is to be understood that such a covering as I contemplate may have thickened portions therein, either for properly embedding holding or securing elements, as is shown in the drawings, or for the purpose of reinforcing the running board at points of excessive wear.

Also, it is to be understood that while I have principally illustrated holding devices comprised of wires or metallic strips, such devices may be made of other materials. Various other and further modifications of my invention can obviously be made, and such are intended to be within the spirit and scope of the appended claims.

I claim:—

1. The combination with an apertured running board, of a flexible covering therefor, reinforcing members embedded in and extending laterally of said covering and emerging therefrom at spaced intervals to provide geometric configurations adapted to pass through said apertures, and securing means adapted to engage said configurations to hold said covering and board in assembled relation.

2. In an automobile running board, a supporting member comprising a sheet metal member having a plurality of spaced apertures therein, a covering for said supporting member comprising a sheet of flexible material having a plurality of separated flexible metal strips embedded therein, means associated with said metal strips and adapted to extend through the apertures in the supporting member and to be interlocked with said supporting member to hold the cover tightly down against the supporting member.

3. In an automobile running board, a supporting member comprising a sheet metal member having a plurality of spaced apertures therein, a covering for said supporting member comprising a sheet of flexible material having a plurality of thin metal strips embedded therein, each of said strips having a plurality of apertures therein, and means associated with said metal strips and extending through the apertures in said strips and the apertures in said supporting member and interlocked with said supporting member.

4. In an automobile running board, a supporting member comprising a sheet metal member having a plurality of spaced apertures therein, a covering for said supporting member comprising a sheet of flexible material having a plurality of narrow metal strips embedded therein, each of said strips having a plurality of apertures therein, the apertures in the strips and in the supporting member being arranged so as to be substantially in registration when the covering is in position on the supporting member, and means for holding said cover tightly down against the supporting member, said means comprising members having portions embedded in said covering, said members extending through aligned apertures in said strips and said supporting member and adapted to be interlocked with said supporting member.

5. A combination with an automobile running board having a plurality of apertures therein of a flexible covering and a plurality of holding and reenforcing devices embedded in said covering comprising strips extending along the covering parallel with the surface of the running board, and means adapted to co-act with said apertures to exert tension on said strips and to draw the covering down against and across the running board under tension.

6. In a running board, a supporting member having a plurality of apertures therethrough, a covering of flexible material having reenforcing and securing means associated therewith, the reenforcing means comprising strips of metal extending longitudinally of the cover and spaced apart transversely thereof, said strips having apertures therein arranged to be substantially in alignment with the apertures in the supporting member when the cover is in position on said supporting member, the securing means comprising members extending through the apertures in the reenforcing strips and the supporting member and adapted to be interlocked with the supporting member to pull the cover tightly down against the surface of the supporting member.

7. A running board cover flexible throughout comprising a sheet of molded and vulcanized rubber having embedded therein a reinforcement consisting of a plurality of elongated metal members in substantially coextending laterally spaced relation to each other, and spaced mechanical fasteners having connection with said reinforcing members and projecting from the underside of the cover.

8. In a vehicle running board, a running board body having a plurality of spaced apertures therein, a cover flexible throughout and adapted to be applied to said body comprising a sheet of molded and vulcanized rubber having reinforcing means embedded therein, said reinforcing means comprising metal members arranged to extend longitudinally of the cover and spaced apart transversely thereof, and mechanical fasteners connected with said members and projecting from the underside of the cover at points spaced to correspond substantially with the spacing of the apertures of said running board body, said fasteners having portions adapted to extend through said apertures and to be interlocked with said running board body whereby the cover is drawn and held thereagainst.

BUDD BRONSON.